United States Patent
Liu et al.

(10) Patent No.: US 10,488,674 B2
(45) Date of Patent: Nov. 26, 2019

(54) COLLIMATOR LENS

(71) Applicant: JIANGXI LIANCHUANG ELECTRONIC CO., LTD., Nanchang (CN)

(72) Inventors: Xuming Liu, Nanchang (CN); Kemin Wang, Nanchang (CN); Jiyong Zeng, Nanchang (CN); Haojie Zeng, Nanchang (CN); Yumin Bao, Nanchang (CN); Weijian Chen, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 80 days.

(21) Appl. No.: 15/777,705

(22) PCT Filed: Apr. 2, 2018

(86) PCT No.: PCT/CN2018/081614
§ 371 (c)(1),
(2) Date: May 21, 2018

(87) PCT Pub. No.: WO2019/052155
PCT Pub. Date: Mar. 21, 2019

(65) Prior Publication Data
US 2019/0250422 A1    Aug. 15, 2019

(30) Foreign Application Priority Data

Sep. 15, 2017    (CN) .......................... 2017 1 0835536

(51) Int. Cl.
G02B 27/30    (2006.01)
G02B 13/00    (2006.01)
G02B 9/06    (2006.01)

(52) U.S. Cl.
CPC ............... *G02B 27/30* (2013.01); *G02B 9/06* (2013.01); *G02B 13/003* (2013.01)

(58) Field of Classification Search
CPC ......... G02B 27/30; G02B 9/06; G02B 13/003
(Continued)

(56) References Cited

U.S. PATENT DOCUMENTS 5,917,661 A     6/1999  Tochigi et al.
8,964,311 B2 *  2/2015  Baba .................... G02B 13/003
                                                          359/784

FOREIGN PATENT DOCUMENTS

CN    103109223    5/2013
CN    105204140    12/2015
CN    107436484    12/2017

* cited by examiner

*Primary Examiner* — William Choi
(74) *Attorney, Agent, or Firm* — Hodgson Russ LLP (57)    ABSTRACT

A collimator lens includes a first lens, a second lens and a diaphragm from an object side to an image side of the assembly in turn along an optical axis, in which the first lens is of a positive focal power, and an object side surface thereof is convex; the second lens is of a positive focal power, and an image side surface thereof is convex; optical centers of the first lens and the second lens are arranged along a same straight line, the system meets following formulas: f1>f2; $(dn/dt)1 < -50 \times 10^{-6}/°C.$; $(dn/dt)2 > -10 \times 10^{-6}/°C.$, where f1 represents a focal length of the first lens, f2 represents a focal length of the second lens, $(dn/dt)1$ represents a change rate of a refractive index of the first lens with temperature, and $(dn/dt)2$ represents a change rate of a refractive index of the second lens with temperature.

18 Claims, 6 Drawing Sheets

(58) Field of Classification Search
USPC .......................................................... 359/641
See application file for complete search history.

COLLIMATOR LENS

CROSS-REFERENCE TO RELATED APPLICATIONS

This application is a U.S. national phase application of International Patent Application No. PCT/CN2018/081614, filed Apr. 2, 2018, which claims priority to and benefits of Chinese Patent Application No. 201710835536.9, filed Sep. 15, 2017 by JIANGXI LIANCHUANG ELECTRONIC CO., LTD., the entire contents of which are incorporated herein by reference.

FIELD

The present disclosure relates to the field of camera lens technology, in particularly to a collimator lens.

BACKGROUND

With the rapid development of smart phones, new technologies for camera functions of mobile phones are constantly generated. For example, 3D imaging technology, an optical sensing technology based on 3D structured light and provided by Apple Inc, can be used for face and gesture recognition, which improves camera functions, brings new applications of augmented reality (AR) and transforms an optical image from a past two-dimensional image to a three-dimensional image, thus bringing a more real and clear perception experience.

The 3D structured light technology refers to a technology in which specific laser information is projected onto a surface of an object and then is captured by a camera, and information such as position and depth of the object is calculated according to a change of light information caused by the object, so as to reconstruct the entire three-dimensional space. The specific laser information is an important indicator of the 3D structured light technology, and thus requirements for a collimator lens which projects the laser information onto the surface of the object to be tested are high. Therefore, a collimator lens projecting point light source array with a specific solid angle on a surface of a vertical cavity surface emitting laser (VCSEL) onto the surface of the object to be tested is a key point of 3D imaging quality.

In the existing collimator lens products, a focal length of a lens changes greatly with the change of ambient temperature, which results in significant change in an angle of the light projected by the lens, causes the change of the original light information, and further leads to errors in the calculation of the entire system, thus affecting an accuracy of a profile reconstruction of a three-dimensional object. Moreover, image points projected become larger as the ambient temperature changes, which leads to a sharpness reduction of the clarity of a three-dimensional object reconstructed by the system.

SUMMARY

Embodiments of the present disclosure seek to solve at least one of the problems existing in the related art. Accordingly, an object of the present disclosure is to provide a collimator lens having a stable focal length at different temperatures.

The collimator lens according to embodiments of the present disclosure includes a first lens, a second lens and a diaphragm from an object side to an image side of the collimator lens in turn along an optical axis of the collimator lens, in which the first lens is of a positive focal power, an object side surface of the first lens is convex;

the second lens is of a positive focal power, an image side surface of the second lens is convex;

optical centers of the first lens and the second lens are arranged along a same straight line, the collimator lens meets following formulas:

$f1 > f2;$ $(dn/dt)1 < -50 \times 10^{-6}/° C.;$ $(dn/dt)2 > -10 \times 10^{-6}/° C.,$ where f1 represents a focal length of the first lens, f2 represents a focal length of the second lens, (dn/dt)1 represents a change rate of a refractive index of the first lens with temperature, and (dn/dt)2 represents a change rate of a refractive index of the second lens with temperature.

Further, in an embodiment of the present disclosure, the collimator lens meets a following formula:

$0 < f1/f2 < 3.5,$ where f1 represents the focal length of the first lens, and f2 represents the focal length of the second lens.

Further, in an embodiment of the present disclosure, the collimator lens meets a following formula:

$-5 < f/r4 < 0,$ where f represents a focal length of the collimator lens, and r4 represents a curvature radius of the image side surface of the second lens.

Further, in an embodiment of the present disclosure, the collimator lens meets a following formula:

$-2.5 < r1/r4 < 0,$ where r1 represents a curvature radius of the object side surface of the first lens, and r4 represents a curvature radius of the image side surface of the second lens.

Further, in an embodiment of the present disclosure, the collimator lens meets a following formula:

$0.5 < CT2/CT1 < 3.5,$ where CT1 represents a central thickness of the first lens, and CT2 represents a central thickness of the second lens.

Further, in an embodiment of the present disclosure, object side surfaces and image side surfaces of the first lens and the second lens are aspheric.

Further, in an embodiment of the present disclosure, the first lens includes a plastic, and the second lens includes glass.

Further, in an embodiment of the present disclosure, the first lens and the second lens are spaced apart from each other.

Further, in an embodiment of the present disclosure, the first lens and the second lens are non-bonded and independent from each other.

Further, in an embodiment of the present disclosure, each aspheric surface of the first lens and the second lens in the collimator lens meets a following formula:

$$z = \frac{ch^2}{1 + \sqrt{1 - (1+K)c^2h^2}} + Bh^4 + Ch^6 + Dh^8 + Eh^{10} + Fh^{12},$$

where z represents a distance between a surface and a tangent plane of a vertex of the surface in a direction of the optical axis, c represents a curvature of the vertex of the surface, K represents a $2^{nd}$ order correction coefficient, h represents a height from the surface to the optical axis, B, C, D, E and F represent $4^{th}$, $6^{th}$, $8^{th}$, $10^{th}$ and $12^{th}$ order correction coefficients, respectively.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail in the following descriptions, examples of which are shown in the accompanying drawings, in which the same or similar reference numerals represent the same or similar elements or elements having the same or similar functions throughout the descriptions. The embodiments described hereinafter with reference to the accompanying drawings are explanatory and illustrative, which are used to generally understand the present disclosure, but shall not be construed to limit the present invention.

Unless otherwise defined, all technical and scientific terms used herein have the same meaning as commonly understood by one skilled in the art to which the present disclosure belongs. The terminology used in the description of the present disclosure is for the purpose of describing specific embodiments only, and is not intended to limit the present disclosure. As used herein, the term "and/or" represents and contains any one and all possible combinations of one or more associated listed items.

Figure 1:
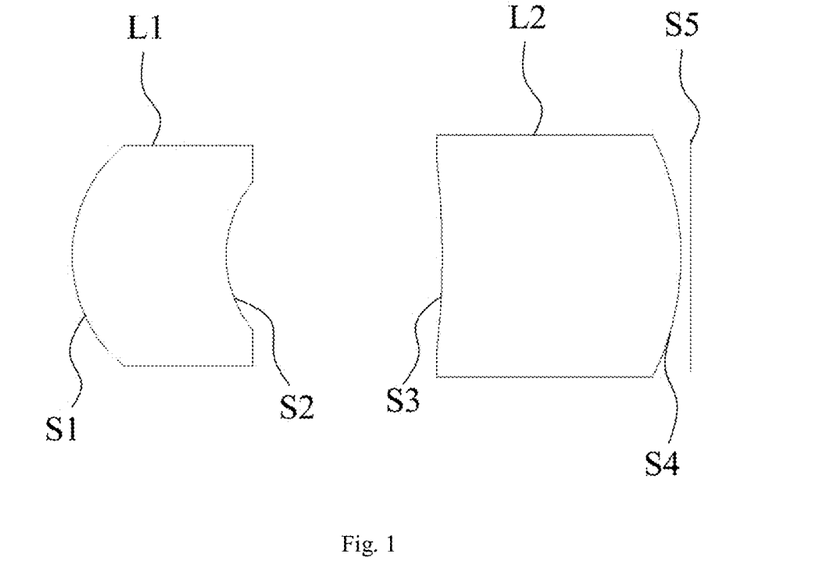
FIG. 1 is a cross sectional view of a collimator lens according to an embodiment of the present disclosure.

With reference to FIG. 1, in an embodiment of the present disclosure, a collimator lens includes a first lens L1, a second lens L2 and a diaphragm S5 from an object side to an image side of the collimator lens in turn along an optical axis of the collimator lens, in which the first lens L1 is of a positive focal power, an object side surface of the first lens L1 is convex;

the second lens L2 is of a positive focal power, an image side surface of the second lens L2 is convex;

the diaphragm S5 is arranged behind the second lens L2, and is configured to define an aperture effectively and facilitate optical design;

optical centers of the first lens and the second lens are arranged along a same straight line, the collimator lens meets following formulas:

$f1 > f2;$ $(dn/dt)1 < -50 \times 10^{-6} /° C.;$ $(dn/dt)2 > -10 \times 10^{-6} /° C.,$ where f1 represents a focal length of the first lens, f2 represents a focal length of the second lens, (dn/dt)1 represents a change rate of a refractive index of the first lens with temperature, and (dn/dt)2 represents a change rate of a refractive index of the second lens with temperature.

A difference between the focal length f1 of the first lens L1 and the focal length f2 of the second lens L2 is greater than 0, i.e., the collimator lens meets the formula of f1>f2. This condition defines that compared with the second lens L2, the first lens L1 has a lower light deflection ability.

The change rates (dn/dt)1 and (dn/dt)2 of refractive indices of the first lens L1 and the second lens L2 with temperature meet the formulas of $(dn/dt)1 < -50 \times 10^{-6}/°C$ and $(dn/dt)2 > -10 \times 10^{-6}/°C$, respectively. These conditions define the change rates of the refractive indices of the two lenses with temperature, and make configurations of lenses reasonable in view of thermal expansion, thus ensuring the stability of the focal length of lens assembly at different temperatures.

In the collimator lens as described above, since change rates of the refractive indices of the lenses with temperature are suitably configured, influences of thermal expansions of the lenses themselves and structural members of the collimator lens on the focal length can be offset, and thus the focal length can be kept stable at different temperatures and the collimator lens may be used at different temperatures. Moreover, with such a collimator lens, the angle of the light projected by the lens shows no obvious change and the original light formation is not changed.

Specifically, in the collimator lens, the first lens L1 is of a positive focal power, an object side surface S1 of the first lens L1 is convex, and the object side surface S1 and an image side surface S2 of the first lens L1 are aspheric surfaces, so as to converge telecentric beam from a laser and effectively control an overall volume of the optical lens assembly in combination with the enough positive focal power of the first lens L1.

The second lens L2 is of a positive focal power, an image side surface S4 of the second lens L2 is convex, and an object side surface S3 and the image side surface S4 of the second lens L2 are aspheric surfaces, thus correcting the aberration of the optical lens and controlling an emergent angle effectively.

Object side surfaces and image side surfaces of the first lens L1 and the second lens L2 are aspheric surfaces. More control variables may be obtained by making two surfaces of each lens into non-spherical surfaces, so as to reduce aberration.

In an embodiment of the present disclosure, two independent lenses, which are non-bonded, are used in the collimator lens. In other words, the first lens L1 and the second lens L2 are spaced apart from each other. Bonded lenses have a more complex process compared with the un-bonded lenses, especially that surfaces to be bonded of two lenses should have a high surface accuracy to achieve a high bonding degree when the two lenses are bonded. Moreover, in the bonding process, the bonding degree may also be influenced by a displacement, which may affect the optical imaging quality negatively. On the contrary, in the collimator lens according to embodiments of the present disclosure, two independent lenses, which are non-bonded, are used, thus solving problems resulted from the bonded lenses effectively.

In the optical lens assembly provided by embodiments of the present disclosure, the first lens L1 may include a plastic to reduce the production cost, and the second lens L2 may include glass to ensure that a resolving power of the lens system is not significantly changed when the working temperature is changed.

In an embodiment of the present disclosure, the collimator lens meets a following formula:

$$0 < f1/f2 < 3.5,$$

where f1 represents the focal length of the first lens L1, and f2 represents the focal length of the second lens L2. This condition defines the relationship of focal lengths of the first lens L1 and the second lens L2, such that the light passing through the first lens L1 is converged on an imaging plane, and aberration of the collimator lens is reduced.

In an embodiment of the present disclosure, the collimator lens meets a following formula:

$$-5 < f/r4 < 0,$$

where f represents a focal length of the collimator lens, and r4 represents a curvature radius of the image side surface S4 of the second lens L2.

In an embodiment of the present disclosure, the collimator lens meets a following formula:

$$-2.5 < r1/r4 < 0,$$

where r1 represents a curvature radius of the object side surface S1 of the first lens L1, and r4 represents a curvature radius of the image side surface S4 of the second lens L2. This condition defines that the object side surface S1 of the first lens L1 and the image side surface S4 of the second lens L2 face to opposite directions, such that the light passing through the first lens L1 is converged on the imaging plane, and aberration of the collimator lens is reduced.

In an embodiment of the present disclosure, the collimator lens meets a following formula:

$$0.5 < CT2/CT1 < 3.5,$$

where CT1 represents a central thickness of the first lens L1, and CT2 represents a central thickness of the second lens L2. This condition defines a relationship between the central thickness of the first lens L1 and the second lens L2. Due to a suitable configuration of the central thickness of the lenses, process, manufacture and assembly of the optical lens assembly are improved.

The present disclosure is further described with reference to several embodiments as follows. The collimator lens in each embodiment is different from each other for example in thickness and curvature radius of a lens. For a specific difference, reference may be made to a parameter table in each embodiment. The following embodiments are merely illustrated embodiments of the present disclosure, and the present disclosure is not limited to these embodiments. Other changes, substitutions, combinations and simplifications made without departing from the innovations of the present disclosure should be regarded as equivalent replacement, which are included in the protection scope of the present disclosure.

In all embodiments of the present disclosure, f represents an effective focal length of the collimator lens, NA represents a numerical aperture, r represents a curvature radius of an vertex of an optical surface, d represents a distance between optical surfaces (a distance between vertexes of two adjacent optical surfaces), $n_d$ represents a refractive index of a lens, Vd represents a abbe number of a lens and is configured to measure a light dispersion degree of a media, and TTL represents a total track length of the collimator lens.

In each embodiment of the present disclosure, each aspheric surface of the first lens and the second lens in the collimator lens meets a following formula:

$$z = \frac{ch^2}{1 + \sqrt{1 - (1+K)c^2 h^2}} + Bh^4 + Ch^6 + Dh^8 + Eh^{10} + Fh^{12}$$

where z represents a distance between a surface and a tangent plane of a vertex of the surface in a direction of the optical axis, c represents a curvature of the vertex of the surface, K represents a $2^{nd}$ order correction coefficient, h represents a height from the surface to the optical axis, B, C, D, E and F represent $4^{th}$, $6^{th}$, $8^{th}$, $10^{th}$ and $12^{th}$ order correction coefficients, respectively.

Embodiment 1

Figure 2A:
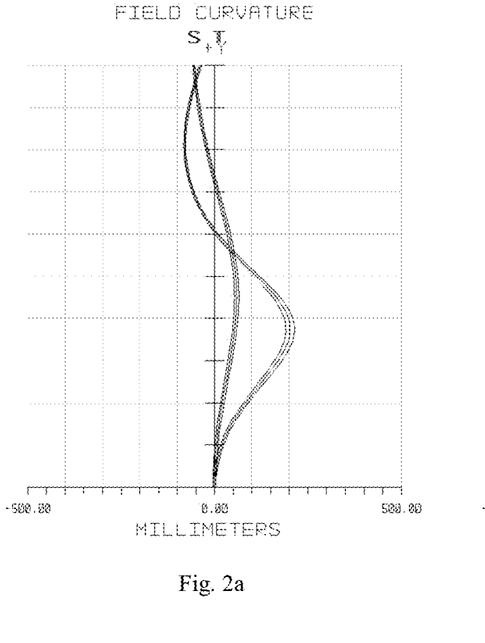
FIG. 2a is a diagram showing a field curvature curve of a collimator lens according to Embodiment 1 of the present disclosure when imaging at an image distance of 300 mm and a temperature of 40° C., in which x axis is the field curvature in mm, and y axis is a field of view defined by a height of an object.
Figure 2B:
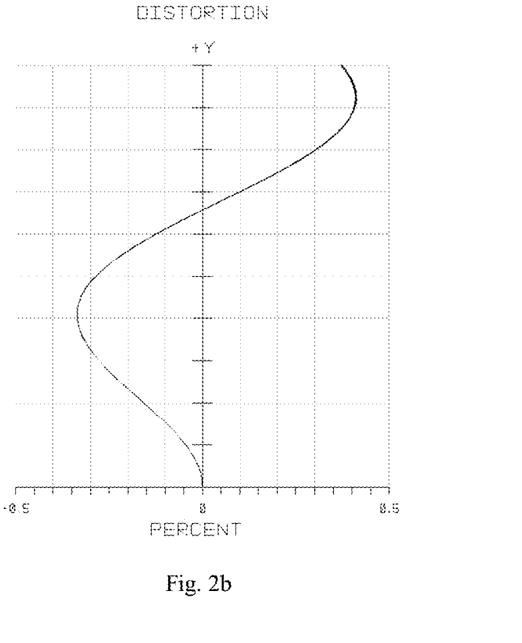
FIG. 2b is a diagram showing a distortion curve of the collimator lens according to Embodiment 1 of the present disclosure when imaging at an image distance of 300 mm and a temperature of 40° C., in which x axis is a distortion value in percent, and y axis is a field of view defined by a height of an object.
Figure 3:
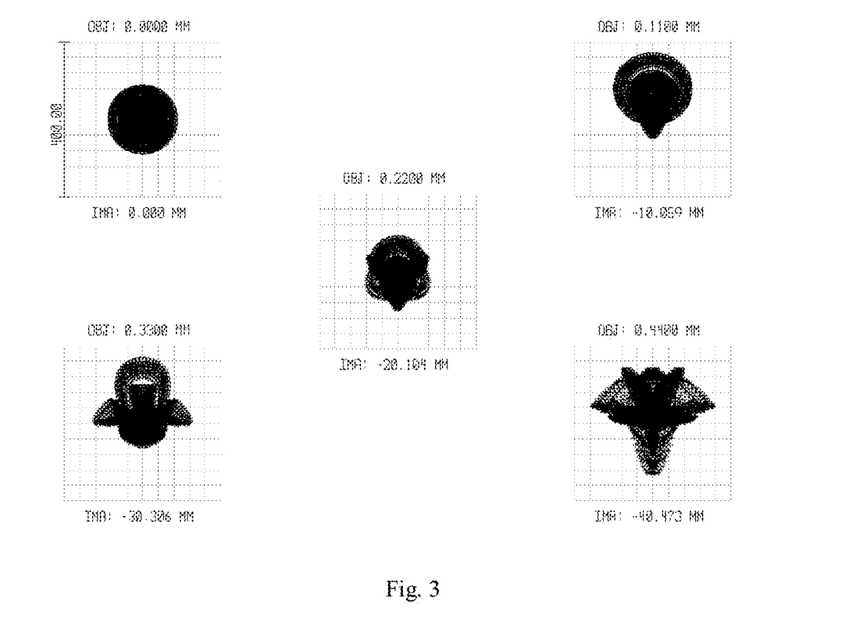
FIG. 3 is a schematic diagram showing a size in μm and a shape of an image point of the collimator lens according to Embodiment 1 of the present disclosure when imaging at an image distance of 300 mm and a temperature of 40° C.
Figure 4:
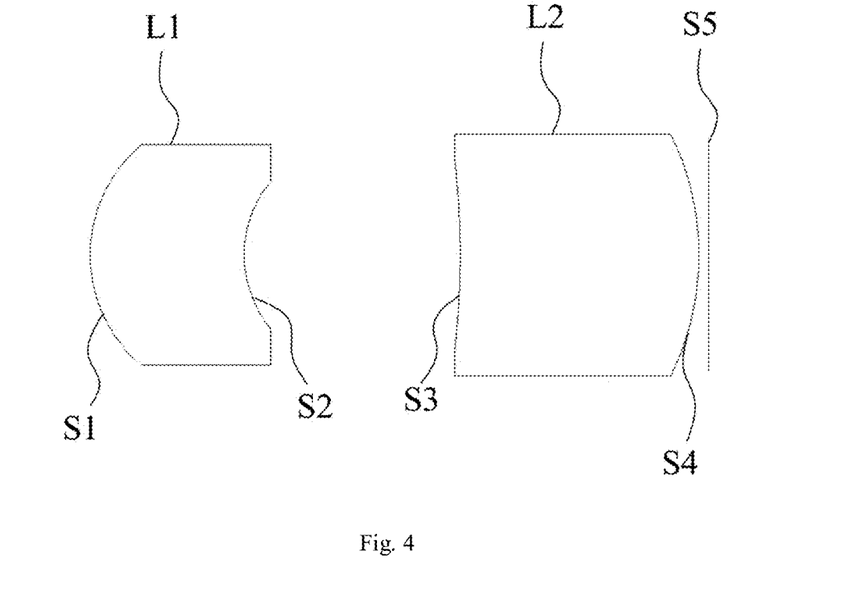
FIG. 4 is a cross sectional view of a collimator lens according to Embodiment 2 of the present disclosure.
Figure 5A:
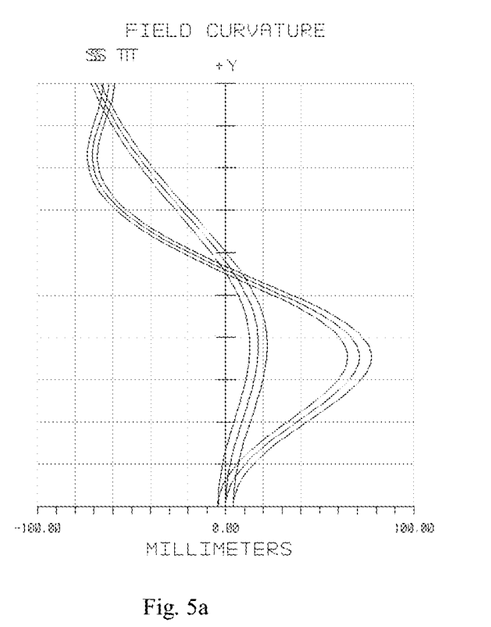
FIG. 5a is a diagram showing a field curvature curve of the collimator lens according to Embodiment 2 of the present disclosure when imaging at an image distance of 300 mm and a temperature of 40° C., in which x axis is the field curvature in mm, and y axis is a field of view defined by a height of an object.
Figure 5B:
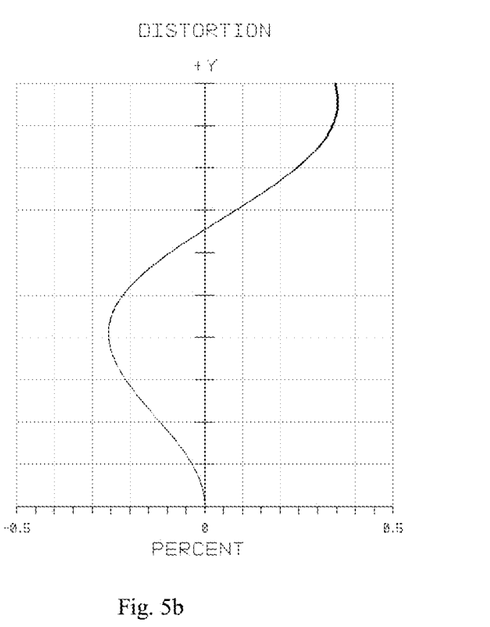
FIG. 5b is a diagram showing a distortion curve of the collimator lens according to Embodiment 2 of the present disclosure when imaging at an image distance of 300 mm and a temperature of 40° C., in which x axis is a distortion value in percent, and y axis is a field of view defined by a height of an object.
Figure 6:
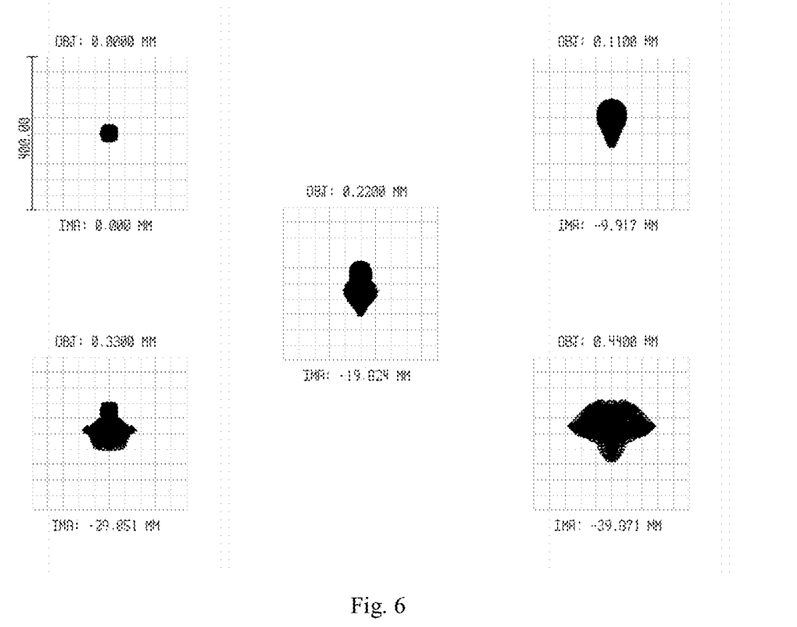
FIG. 6 is a schematic diagram showing a size in μm and a shape of an image point of the collimator lens according to Embodiment 2 of the present disclosure when imaging at an image distance of 300 mm and a temperature of 40° C.
Figure 7:
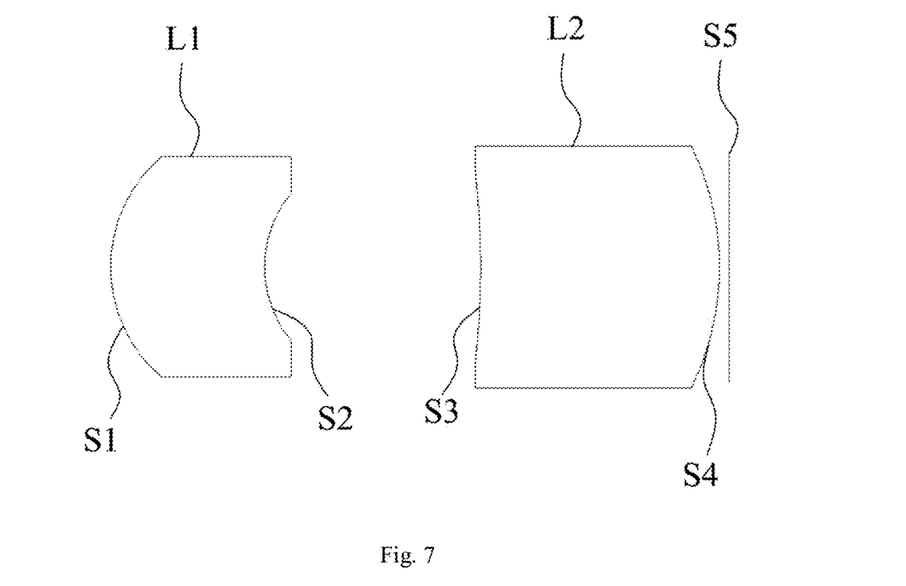
FIG. 7 is a cross sectional view of a collimator lens according to Embodiment 3 of the present disclosure.
Figure 8A:
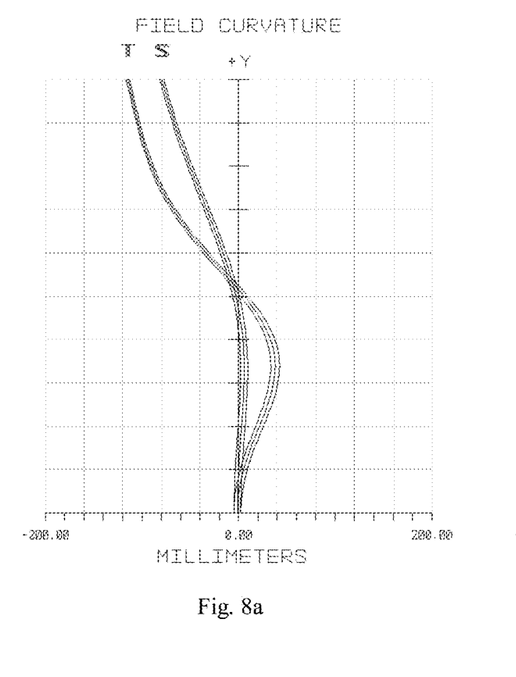
FIG. 8a is a diagram showing a field curvature curve of the collimator lens according to Embodiment 3 of the present disclosure when imaging at an image distance of 300 mm and a temperature of 40° C., in which x axis is the field curvature in mm, and y axis is a field of view defined by a height of an object.
Figure 8B:
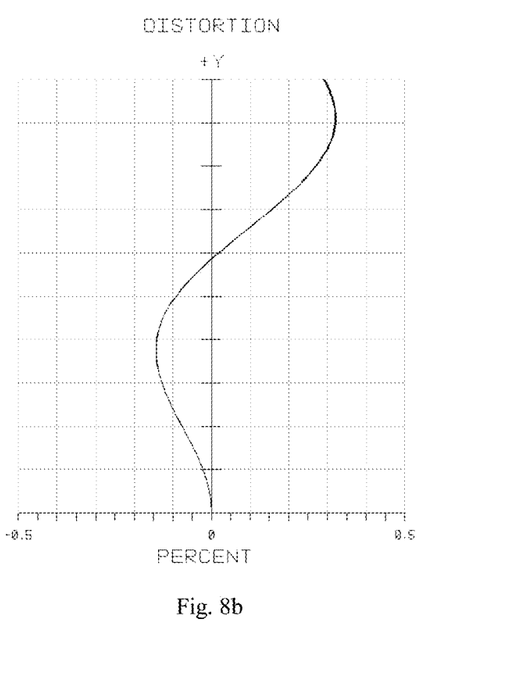
FIG. 8b is a diagram showing a distortion curve of the collimator lens according to Embodiment 3 of the present disclosure when imaging at an image distance of 300 mm and a temperature of 40° C., in which x axis is a distortion value in percent, and y axis is a field of view defined by a height of an object.
Figure 9:
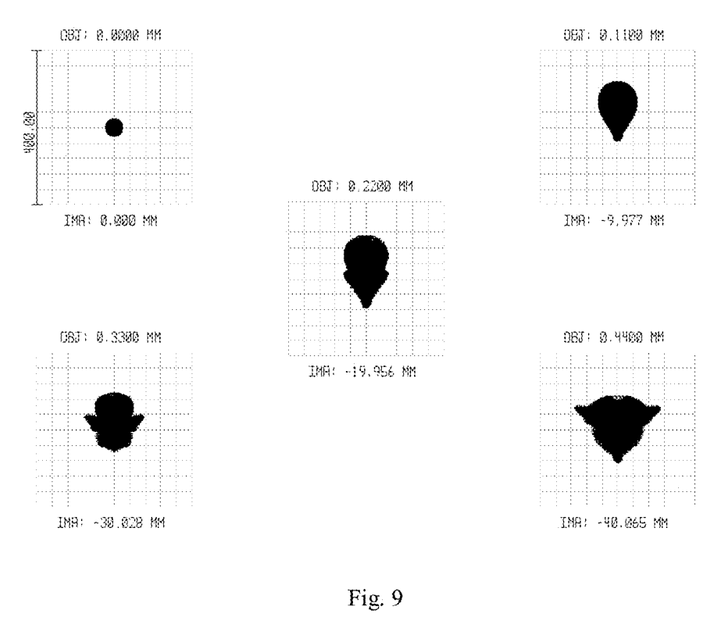
FIG. 9 is a schematic diagram showing a size in μm and a shape of an image point of the collimator lens according to Embodiment 3 of the present disclosure when imaging at an image distance of 300 mm and a temperature of 40° C.
Figure 10:
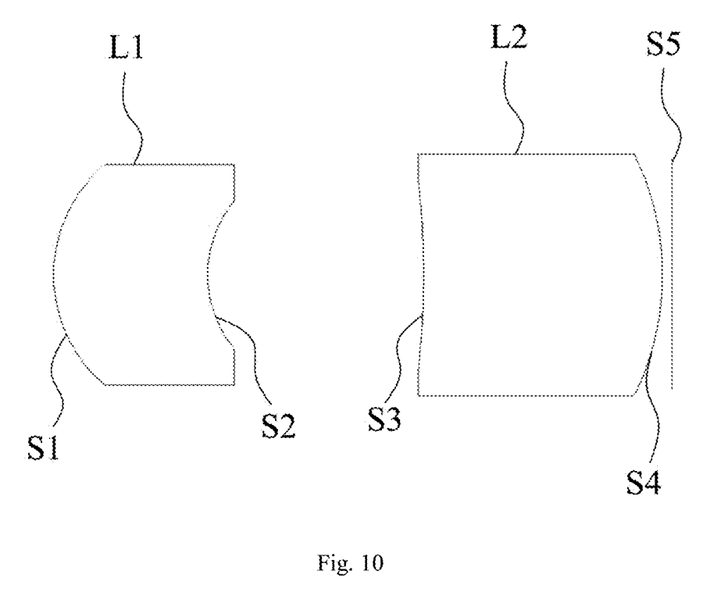
FIG. 10 is a cross sectional view of a collimator lens according to Embodiment 4 of the present disclosure.
Figure 11A:
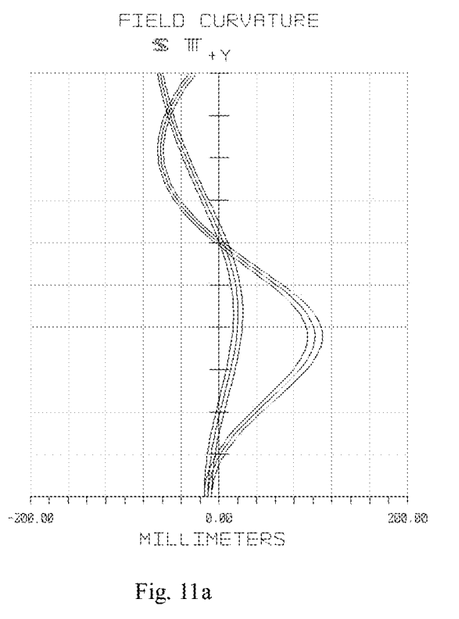
FIG. 11a is a diagram showing a field curvature curve of the collimator lens according to Embodiment 4 of the present disclosure when imaging at an image distance of 300 mm and a temperature of 40° C., in which x axis is the field curvature in mm, and y axis is a field of view defined by a height of an object.
Figure 11B:
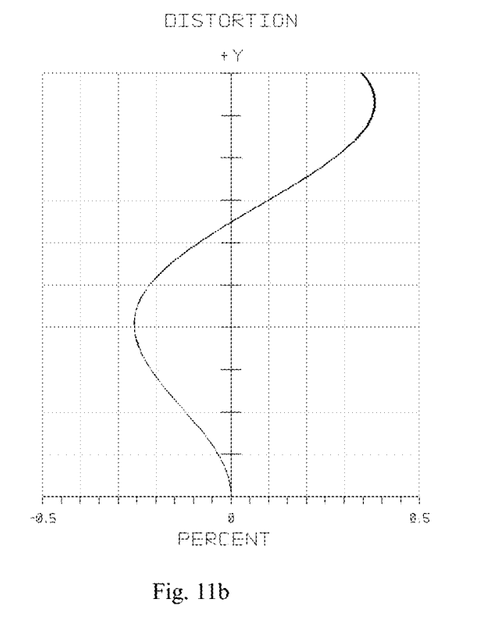
FIG. 11b is a diagram showing a distortion curve of the collimator lens according to Embodiment 4 of the present disclosure when imaging at an image distance of 300 mm and a temperature of 40° C., in which x axis is a distortion value in percent, and y axis is a field of view defined by a height of an object.
Figure 12:
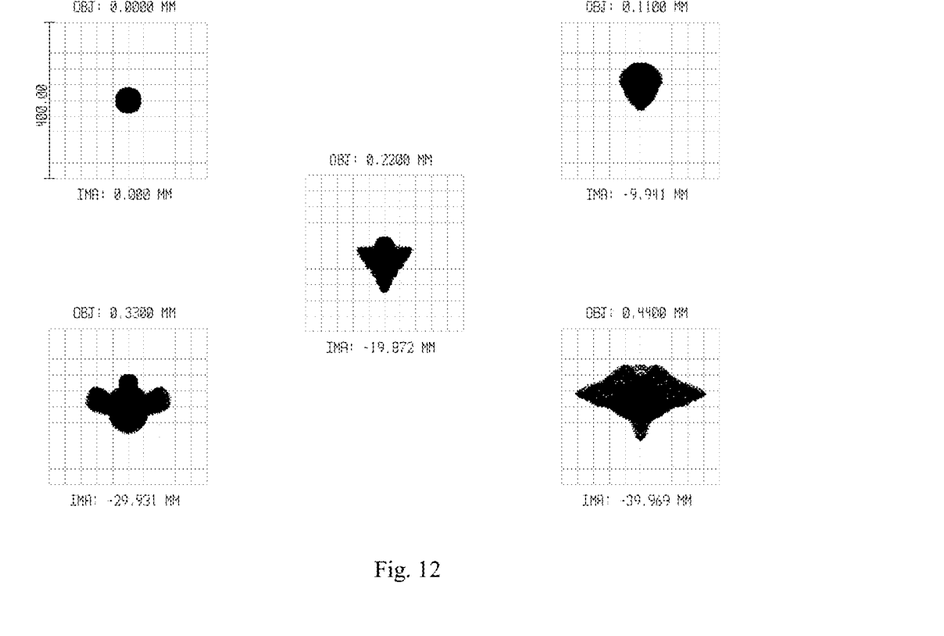
FIG. 12 is a schematic diagram showing a size in μm and a shape of an image point of the collimator lens according to Embodiment 4 of the present disclosure when imaging at an image distance of 300 mm and a temperature of 40° C.

The schematic diagram of a collimator lens according to this embodiment of the present disclosure is shown in FIG. 1. For more details, reference can be made to FIGS. 2a, 2b and 3. Relevant parameters of each lens in the collimator lens are shown in table 1-1.

TABLE 1-1

| Surface No. | Surface type | r | d | $n_d$ | Vd |
|---|---|---|---|---|---|
| 1 | object side surface | spherical | — | 0.5 | | |
| 2 | first lens | aspheric | 0.7455 | 0.8643 | 1.639 | 23.5 |
| 3 | | aspheric | 0.6614 | 1.0112 | | |
| 4 | second lens | aspheric | −21.2815 | 1.2328 | 1.583 | 59.5 |
| 5 | | aspheric | −1.3269 | 0.05 | | |
| 6 | diaphragm | spherical | — | 300 | | |
| 7 | image side surface | spherical | — | — | | |

Parameters of aspheric surfaces of each lens in this embodiment are shown in table 1-2.

TABLE 1-2

| Surface No. | K | B | C | D | E | F |
|---|---|---|---|---|---|---|
| 2 | 1.7386e−01 | −7.8879e−02 | 3.4432e−01 | −5.9165e+00 | 1.7077e+01 | −2.3602e+01 |
| 3 | −1.2516e+00 | 2.3380e+00 | −2.1914e+01 | 3.3674e+02 | −2.1116e+03 | 5.0981e+03 |
| 4 | −5.6293e+00 | 1.1820e−01 | −2.2514e−01 | 1.2919e+00 | −1.8098e+00 | 5.0614e−01 |
| 5 | 2.2090e+00 | 1.6421e−01 | −9.4174e−02 | 1.9409+00 | −5.1264e+00 | 6.6689e+00 |

Embodiment 2

With reference to FIGS. 4, 5a, 5b and 6, a collimator lens provided by Embodiment 2 is shown, and relevant parameters of each lens in the collimator lens are shown in table 2-1.

TABLE 2-1

| Surface No. | Surface type | r | d | $n_d$ | Vd |
|---|---|---|---|---|---|
| 1 | object side surface | spherical | — | 0.5 | | |
| 2 | first lens | aspheric | 0.741 | 0.8491 | 1.639 | 23.5 |
| 3 | | aspheric | 0.7561 | 0.8789 | | |
| 4 | second lens | aspheric | −2.6475 | 1.3565 | 1.589 | 61.3 |
| 5 | | aspheric | −1.1535 | 0.05 | | |
| 6 | diaphragm | spherical | — | 300 | | |
| 7 | image side surface | spherical | — | — | | |

Parameters of aspheric surfaces of each lens in this embodiment are shown in table 2-2.

TABLE 2-2

| Surface No. | K | B | C | D | E | F |
|---|---|---|---|---|---|---|
| 2 | 1.1573e−01 | −1.2495e−01 | 8.5359e−01 | −7.0564e+00 | 1.8796e+01 | −2.3209e+01 |
| 3 | −4.0953e−01 | 1.4871e+00 | −8.2248e+00 | 1.5044e+02 | −9.0660e+02 | 2.3270e+03 |
| 4 | 7.892e−01 | 1.7577e−02 | 8.1167e−01 | 5.4934e+00 | −1.5984e+01 | 1.8823e+01 |
| 5 | −8.0393e−02 | 1.9206e−02 | −3.5522e−02 | 1.5879e−01 | −2.9418e−01 | 2.5262e−01 |

Embodiment 3

With reference to FIGS. 7, 8a, 8b and 9, a collimator lens provided by Embodiment 3 is shown, and relevant parameters of each lens in the collimator lens are shown in table 3-1.

TABLE 3-1

| Surface No. | Surface type | r | d | $n_d$ | Vd |
|---|---|---|---|---|---|
| 1 | object side surface | spherical | — | 0.5 | | |
| 2 | first lens | aspheric | 0.7291 | 0.8358 | 1.639 | 23.5 |
| 3 | | aspheric | 0.6615 | 0.9313 | | |
| 4 | second lens | aspheric | −6.1204 | 1.3466 | 1.619 | 63.9 |
| 5 | | aspheric | −1.3117 | 0.05 | | |
| 6 | diaphragm | spherical | — | 300 | | |
| 7 | image side surface | spherical | — | — | | |

Parameters of aspheric surfaces of each lens in this embodiment are shown in table 3-2.

TABLE 3-2

| Surface No. | K | B | C | D | E | F |
|---|---|---|---|---|---|---|
| 2 | 1.2605e−01 | −1.2321e−01 | 8.1022e−01 | −8.169e+00 | 2.3384e+01 | −3.0979e+01 |
| 3 | −1.2724e+00 | 1.8602e+00 | −3.3856e+00 | 6.9739e+01 | −3.1651e+02 | 6.3849e+02 |
| 4 | −1.1193e+01 | 1.2609e−01 | −8.7273e−01 | 5.9914e+00 | −1.6129e+01 | 1.6425e+01 |
| 5 | −6.3493e−02 | 2.8328e−02 | −4.2138e−02 | 1.4555e−01 | −1.6713e−01 | 1.1499e−01 |

Embodiment 4

With reference to FIGS. 10, 11a, 11b and 12, a collimator lens provided by Embodiment 4 is shown, and relevant parameters of each lens in the collimator lens are shown in table 4-1.

TABLE 4-1

| Surface No. | Surface type | r | d | $n_d$ | Vd |
|---|---|---|---|---|---|
| 1 | object side surface | spherical | — | 0.5 | | |
| 2 | first lens | aspheric | 0.7434 | 0.7887 | 1.636 | 23.9 |
| 3 | | aspheric | 0.7507 | 1.1095 | | |
| 4 | second lens | aspheric | −4.0195 | 1.2225 | 1.694 | 53.2 |
| 5 | | aspheric | −1.4037 | 0.05 | | |
| 6 | diaphragm | spherical | — | 300 | | |
| 7 | image side surface | spherical | — | — | | |

Parameters of aspheric surfaces of each lens in this embodiment are shown in table 4-2.

TABLE 4-2

| Surface No. | K | B | C | D | E | F |
|---|---|---|---|---|---|---|
| 2 | 1.5509e−01 | −1.3027e−02 | 1.5065e−01 | −3.7499e+00 | 1.1334e+01 | −1.8439e+01 |
| 3 | −2.0933e−01 | 1.6299e+00 | −1.2069e+01 | 1.8413e+02 | −9.9740e+02 | 2.1038e+03 |
| 4 | 6.8884e+00 | 4.9206e−02 | 2.3409e−01 | −2.3477e+00 | 1.0817e+01 | 1.6224e+01 |
| 5 | 1.7425e−01 | 1.9199e−02 | 9.7063e−02 | −4.5391e−01 | 1.0536e+00 | −8.4799e−01 |

It is noted that the smaller the data range of the image points is, the better the lens performance is. It can be seen from figures of each embodiment of the present disclosure, a root mean square (RMS) radius of the image point in each embodiment is within 80 μm when imaging at an image distance of 300 mm and a temperature of 40° C., which illustrates that the aberration in each embodiment is well corrected.

Table 5 shows optical performances corresponding to the above four embodiments, including a focal length f of the collimator lens, a numerical aperture NA, a total track length TTL of the collimator lens, and values corresponding to formulas described hereinbefore.

TABLE 5

| Formula | Embodiment 1 | Embodiment 2 | Embodiment 3 | Embodiment 4 |
|---|---|---|---|---|
| f (mm) | 3.274 | 3.324 | 3.304 | 3.314 |
| NA | 0.18 | 0.18 | 0.18 | 0.18 |
| TTL (mm) | 3.658 | 3.535 | 3.664 | 3.671 |
| f1 − f2 | 0.858 | 0.044 | 0.649 | 0.317 |
| (dn/dt)1 ($10^{-6}$/° C.) | −115 | −115 | −115 | −110 |
| (dn/dt)2 ($10^{-6}$/° C.) | 3.9 | 3.8 | −3.0 | 4.7 |
| f1/f2 | 1.355 | 1.017 | 1.262 | 1.119 |
| f/r4 | −2.467 | −2.882 | −2.519 | −2.361 |
| r1/r4 | −0.562 | −0.642 | −0.556 | −0.529 |
| CT2/CT1 | 1.426 | 1.598 | 1.611 | 1.550 |

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example" "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments of the present invention have been shown and described, it would be appreciated by those ordinary skilled in the art that the above embodiments cannot be construed to limit the present disclosure, and various changes, modifications, alternatives and variants can be made in these embodiments without departing from principles and spirits of the present invention. Therefore, the protection scope of the present disclosure is defined by the claims.

What is claimed is:

1. A collimator lens, comprising a first lens, a second lens and a diaphragm from an object side to an image side of the collimator lens in turn along an optical axis of the collimator lens, wherein
   the first lens is of a positive focal power, an object side surface of the first lens is convex;
   the second lens is of a positive focal power, an image side surface of the second lens is convex;
   optical centers of the first lens and the second lens are arranged along a same straight line,
   the collimator lens meets following formulas:

$f1 > f2$;

$(dn/dt)1 < -50 \times 10^{-6}$/° C.;

$(dn/dt)2 > -10 \times 10^{-6}$/° C., where f1 represents a focal length of the first lens, f2 represents a focal length of the second lens, (dn/dt)1 represents a change rate of a refractive index of the first lens with temperature, and (dn/dt)2 represents a change rate of a refractive index of the second lens with temperature.

2. The collimator lens according to claim 1, wherein the collimator lens meets a following formula:

$0 < f1/f2 < 3.5$, where f1 represents the focal length of the first lens, and f2 represents the focal length of the second lens.

3. The collimator lens according to claim 2, wherein object side surfaces and image side surfaces of the first lens and the second lens are aspheric surfaces.

4. The collimator lens according to claim 2, wherein the first lens comprises a plastic, and the second lens comprises glass.

5. The collimator lens according to claim 1, wherein the collimator lens meets a following formula:

$-5 < f/r4 < 0$, where f represents a focal length of the collimator lens, and r4 represents a curvature radius of the image side surface of the second lens.

6. The collimator lens according to claim 5, wherein object side surfaces and image side surfaces of the first lens and the second lens are aspheric surfaces.

7. The collimator lens according to claim 5, wherein the first lens comprises a plastic, and the second lens comprises glass.

8. The collimator lens according to claim 1, wherein the collimator lens meets a following formula:

$-2.5 < r1/r4 < 0$, where r1 represents a curvature radius of the object side surface of the first lens, and r4 represents a curvature radius of the image side surface of the second lens.

9. The collimator lens according to claim 8, wherein object side surfaces and image side surfaces of the first lens and the second lens are aspheric surfaces.

10. The collimator lens according to claim 8, wherein the first lens comprises a plastic, and the second lens comprises glass.

11. The collimator lens according to claim 1, wherein the collimator lens meets a following formula:

$0.5 < CT2/CT1 < 3.5$, where CT1 represents a central thickness of the first lens, and CT2 represents a central thickness of the second lens.

12. The collimator lens according to claim 11, wherein object side surfaces and image side surfaces of the first lens and the second lens are aspheric surfaces.

13. The collimator lens according to claim 11, wherein the first lens comprises a plastic, and the second lens comprises glass.

14. The collimator lens according to claim 1, wherein object side surfaces and image side surfaces of the first lens and the second lens are aspheric surfaces.

15. The collimator lens according to claim 14, wherein each aspheric surface of the first lens and the second lens in the collimator lens meets a following formula:

$$z = \frac{ch^2}{1 + \sqrt{1 - (1+K)c^2 h^2}} + Bh^4 + Ch^6 + Dh^8 + Eh^{10} + Fh^{12},$$

where z represents a distance between a surface and a tangent plane of a vertex of the surface in a direction of the optical axis, c represents a curvature of the vertex of the surface, K represents a $2^{nd}$ order correction coefficient, h represents a height from the surface to the optical axis, B, C, D, E and F represent $4^{th}$, $6^{th}$, $8^{th}$, $10^{th}$ and $12^{th}$ order correction coefficients, respectively.

16. The collimator lens according to claim 1, wherein the first lens comprises a plastic, and the second lens comprises glass.

17. The collimator lens according to claim 1, wherein the first lens and the second lens are spaced apart from each other.

18. The collimator lens according to claim 1, wherein the first lens and the second lens are non-bonded and independent from each other.

* * * * *